US010457805B2

(12) United States Patent
Gu

(10) Patent No.: US 10,457,805 B2
(45) Date of Patent: *Oct. 29, 2019

(54) DAMPING THERMOPLASTIC ELASTOMERS

(71) Applicant: PolyOne Corporation, Avon Lake, OH (US)

(72) Inventor: Jiren Gu, Crystal Lake, IL (US)

(73) Assignee: PolyOne Corporation, Avon Lake, OH (US)

( * ) Notice: Subject to any disclaimer, the term of this patent is extended or adjusted under 35 U.S.C. 154(b) by 472 days.

This patent is subject to a terminal disclaimer.

(21) Appl. No.: 15/040,151

(22) Filed: Feb. 10, 2016

(65) Prior Publication Data

US 2016/0230000 A1   Aug. 11, 2016

Related U.S. Application Data

(60) Provisional application No. 62/114,701, filed on Feb. 11, 2015.

(51) Int. Cl.

| | |
|---|---|
| B32B 25/08 | (2006.01) |
| C08L 53/02 | (2006.01) |
| B32B 27/30 | (2006.01) |
| B32B 27/34 | (2006.01) |
| B32B 27/32 | (2006.01) |
| B32B 27/40 | (2006.01) |
| B32B 27/36 | (2006.01) |
| B32B 25/04 | (2006.01) |

(52) U.S. Cl.
CPC .......... *C08L 53/025* (2013.01); *B32B 25/042* (2013.01); *B32B 25/08* (2013.01); *B32B 27/302* (2013.01); *B32B 27/308* (2013.01); *B32B 27/32* (2013.01); *B32B 27/34* (2013.01); *B32B 27/36* (2013.01); *B32B 27/365* (2013.01); *B32B 27/40* (2013.01); *B32B 2250/02* (2013.01); *B32B 2250/24* (2013.01); *B32B 2270/00* (2013.01); *B32B 2274/00* (2013.01); *B32B 2307/10* (2013.01); *B32B 2307/102* (2013.01); *B32B 2307/308* (2013.01); *B32B 2307/51* (2013.01); *B32B 2307/558* (2013.01); *B32B 2307/56* (2013.01); *B32B 2307/71* (2013.01); *B32B 2419/00* (2013.01); *B32B 2457/00* (2013.01); *B32B 2509/00* (2013.01); *B32B 2535/00* (2013.01); *B32B 2571/00* (2013.01); *B32B 2605/00* (2013.01); *C08L 2205/02* (2013.01); *C08L 2205/035* (2013.01); *C08L 2207/04* (2013.01)

(58) Field of Classification Search
CPC ........ C08L 53/02; C08L 53/025; B32B 25/08; B32B 27/302; B32B 27/32; B32B 27/34; B32B 27/365; B32B 27/40
See application file for complete search history.

(56) References Cited

U.S. PATENT DOCUMENTS

| | | |
|---|---|---|
| 4,411,954 A | 10/1983 | Butch, III et al. |
| 4,987,194 A | 1/1991 | Maeda et al. |
| 5,358,783 A | 10/1994 | Diehl et al. |
| 5,399,626 A | 3/1995 | Erickson et al. |
| 5,436,295 A | 7/1995 | Nishikawa et al. |
| 5,777,031 A | 7/1998 | Djiauw et al. |
| 5,869,562 A | 2/1999 | Lindquist et al. |
| 5,910,540 A | 6/1999 | Takahashi |
| 5,973,049 A | 10/1999 | Bieser et al. |
| 6,054,532 A | 4/2000 | Wang et al. |
| 6,103,803 A | 8/2000 | Cheung et al. |
| 6,156,842 A | 12/2000 | Hoenig et al. |
| 6,262,161 B1 | 7/2001 | Betso et al. |
| 6,319,969 B1 | 11/2001 | Walther et al. |
| 6,384,138 B1 | 5/2002 | Jacob et al. |
| 6,476,117 B1 | 11/2002 | Wang et al. |
| 6,824,730 B2 | 11/2004 | Mashita et al. |
| 6,984,688 B2 | 1/2006 | Gu |
| 7,015,155 B2 | 3/2006 | Zhou et al. |
| 7,241,837 B2 | 7/2007 | Yaguchi et al. |
| 7,267,855 B2 | 9/2007 | Handlin, Jr. et al. |

(Continued)

FOREIGN PATENT DOCUMENTS

| | | |
|---|---|---|
| CN | 1648161 A | 8/2005 |
| JP | 3750459 B2 | 1/2006 |

(Continued)

OTHER PUBLICATIONS

"ARKON P and M series" acquired from http://www.arakawa-usa.com/pdf/ARKON_PandMseries.PDF on Nov. 6, 2018.*
"KRATON G (SEBS and SEBS OE)" acquired from http://kraton.com/products/KRATON_G.php on Nov. 6, 2018.*
Jonas Öborn et al., "Styrene-Ethylene/Butylene-Styrene Blends for Improved Constrained-Layer Damping," Journal of Applied Polymer Science, vol. 80, pp. 2865-2876 (2001).
Kilian et al.: "Two new HSBCs for potential medical use," TPE Magazine, Apr. 2010, pp. 220-225.
Chapman et al.: "High performance styrenic block copolymers in medical and damping applications," TPE Magazine, Jan. 2012, pp. 28-31.

(Continued)

*Primary Examiner* — Gerard Higgins
(74) *Attorney, Agent, or Firm* — Michael J. Sambrook; Emily E. Vlasek

(57) ABSTRACT

A thermoplastic elastomer compound includes styrenic block copolymer and high softening point tackifier. The styrenic block copolymer has a Copolymer Tan Delta Peak Temperature and the thermoplastic elastomer compound has a Compound Tan Delta Peak Temperature. The Compound Tan Delta Peak Temperature is greater than the Copolymer Tan Delta Peak Temperature. The thermoplastic elastomer compound exhibits useful damping properties at or above room temperature while also advantageously possessing improved stability for processing and/or applications at high temperatures and upon exposure to weathering.

8 Claims, No Drawings

(56) References Cited

U.S. PATENT DOCUMENTS

| | | | |
|---|---|---|---|
| 7,364,221 B2 | 4/2008 | Tahri et al. | |
| 7,842,747 B2 | 11/2010 | Gu et al. | |
| 7,923,505 B2 | 4/2011 | Zhou et al. | |
| 8,299,177 B2 | 10/2012 | Wright et al. | |
| 8,378,015 B2 | 2/2013 | He et al. | |
| 8,436,105 B2 | 5/2013 | Kohlstrung et al. | |
| 8,470,928 B2 | 6/2013 | Schumann et al. | |
| 8,513,347 B2 | 8/2013 | Tse et al. | |
| 8,729,173 B2 | 5/2014 | Wang et al. | |
| 2001/0018490 A1 | 8/2001 | Mashita et al. | |
| 2003/0158336 A1 | 8/2003 | Yaguchi et al. | |
| 2005/0266237 A1* | 12/2005 | Asthana | C09K 3/10 |
| | | | 428/343 |
| 2007/0004830 A1 | 1/2007 | Flood et al. | |
| 2007/0021560 A1 | 1/2007 | Tse et al. | |
| 2007/0100060 A1 | 5/2007 | Tahri et al. | |
| 2007/0117934 A1 | 5/2007 | He et al. | |
| 2007/0259141 A1 | 11/2007 | Ohki | |
| 2008/0176969 A1 | 7/2008 | Tahri et al. | |
| 2009/0012227 A1 | 1/2009 | Wang et al. | |
| 2009/0108499 A1* | 4/2009 | Chrzanowski | B29B 17/02 |
| | | | 264/328.17 |
| 2009/0275687 A1* | 11/2009 | Chrzanowski | B29C 45/0001 |
| | | | 524/425 |
| 2010/0068452 A1 | 3/2010 | Kusanose et al. | |
| 2010/0210163 A1 | 8/2010 | He et al. | |
| 2010/0314813 A1 | 12/2010 | Wojtowicki et al. | |
| 2011/0034614 A1 | 2/2011 | Nakajima et al. | |
| 2011/0143112 A1 | 6/2011 | Cai et al. | |
| 2011/0184082 A1 | 7/2011 | Wright et al. | |
| 2012/0037396 A1* | 2/2012 | Gu | C08L 71/12 |
| | | | 174/110 AR |
| 2012/0115998 A1 | 5/2012 | Schumann et al. | |
| 2012/0136129 A1 | 5/2012 | Kohlstrung et al. | |
| 2013/0202787 A1 | 8/2013 | Hu et al. | |
| 2013/0225020 A1 | 8/2013 | Flood et al. | |
| 2018/0022914 A1 | 1/2018 | Gu | |
| 2018/0022915 A1 | 1/2018 | Gu | |
| 2018/0030263 A1 | 2/2018 | Gu | |

FOREIGN PATENT DOCUMENTS

| | | |
|---|---|---|
| JP | 2010180325 A | 8/2010 |
| WO | 00/78860 A1 | 12/2000 |
| WO | 02/28965 A1 | 4/2002 |
| WO | 03/80692 A1 | 10/2003 |
| WO | 2014/194155 A1 | 12/2014 |
| WO | 2016/130627 A1 | 8/2016 |
| WO | 2016/130630 A1 | 8/2016 |
| WO | 2016/130631 A1 | 8/2016 |
| WO | 2016/130639 A1 | 8/2016 |

OTHER PUBLICATIONS

Carvagno et al.: "Performance resins in tire compounding," Rubber World, Feb. 2014, 3 pages.
E.M. Petrie: "Selecting Tackifiers," SpecialChem, Oct. 3, 2012, 9 pages.
Leaversuch, "'Soft-on-soft' is newest option in soft-touch molding," Plastics Technology, published Mar. 31, 2004, (Year: 2004) 3 pages.
Cray Valley datasheet on Wingtack® 95 resin (Year: 2016) 1 page.

* cited by examiner

DAMPING THERMOPLASTIC ELASTOMERS

CLAIM OF PRIORITY

This application claims the benefit of U.S. Provisional Patent Application Ser. No. 62/114,701 and filed on Feb. 11, 2015, which is hereby incorporated by reference in its entirety.

FIELD OF THE INVENTION

This invention relates to thermoplastic elastomer compounds that exhibit useful damping properties such as vibration, sound, and/or impact damping at or above room temperature.

BACKGROUND OF THE INVENTION

Demand exists in a variety of applications for materials that exhibit damping properties. In general, damping is the dissipation of mechanical energy from a system. Damping can be important in applications such as electronics, sound isolation, automotive and transportation, building and construction, household appliances, industrial equipment, firearms, healthcare and medical devices, and personal and/or sports protection.

The capacity of a material for damping is related to its peak temperature of the tangent of delta (Tan Delta Peak Temperature), which can be determined by dynamic mechanical analysis (DMA) as described, for example, by M. P. Sepe in "Thermal Analysis of Polymers", *Rapra Review Reports*, Vol. 8, No. 11, 1997, which is incorporated herein by reference. The tangent of delta (Tan Delta) of a material is the ratio of its loss modulus (E") to its storage modulus (E'). Consequently, as the value of Tan Delta increases, the response of the material is relatively more viscous than it is elastic, which thus provides greater damping. When graphically depicted against temperature, a Tan Delta curve includes a prominent peak at a particular temperature, which is the Tan Delta Peak Temperature and also can be representative of or comparable to the glass transition temperature (Tg) of the material. In general, a material with a Tan Delta Peak Temperature which is relatively nearer to an application temperature, such as at or above room temperature, will possess better damping properties than a material with a Tan Delta Peak Temperature which is relatively lower than the application temperature.

Thermoplastic elastomers (TPEs), which are polymer materials that exhibit elasticity while remaining thermoplastic, can be used for damping applications. Thermoplastic elastomers can include styrenic block copolymers (SBC), thermoplastic vulcanizates (TPV), thermoplastic olefins (TPO), copolyesters (COPE), thermoplastic urethanes (TPU), copolyamides (COPA), and olefin block copolymers (OBC).

Some commercially available SBCs, such as HYBRAR 5127 available from Kuraray Co., Ltd., are known to exhibit vibration damping properties at room temperature. HYBRAR 5127 has a Tan Delta Peak Temperature that is reported to be 20° C. (i.e., about room temperature). Although HYBRAR 5127 can be formulated into conventional TPE compounds that exhibit effective room temperature damping, it is a relatively low molecular weight and non-hydrogenated material and cannot withstand processing at high temperatures required for some applications nor is it suitable for high temperature applications.

Other commercially available SBCs, such as HYBRAR 7125 available from Kuraray Co., Ltd., are hydrogenated and can withstand processing at the high temperatures. However, the Tan Delta Peak Temperature of HYBRAR 7125 is reported to be −5° C. Disadvantageously, conventional TPE compounds based on HYBRAR 7125 do not possess satisfactory damping properties at room temperature.

Additionally, for some SBCs, it may be desirable to make the SBC softer by oil extension depending on processing and/or end-use application requirements. For example, paraffinic oil can be used as plasticizer to selectively plasticize the soft blocks of SBCs. Although adding paraffinic oil to the SBC results in lower hardness and lower melt viscosity, which may be desirable, doing so also severely decreases the Tan Delta Peak Temperature of the SBC, which negatively affects damping properties at room temperature.

SUMMARY OF THE INVENTION

Consequently, a need exists for TPE compounds that are capable of being processed at relatively high temperatures or suitable for applications at relatively high temperatures while also exhibiting useful damping properties, such as damping properties at or above room temperature. Such a need exists especially for TPE compounds that include plasticizer.

The aforementioned needs are met by one or more aspects of the present invention.

It has been found that, by adding high softening point tackifier to styrenic block copolymer to provide a thermoplastic elastomer compound, the Copolymer Tan Delta Peak Temperature of the styrenic block copolymer can be shifted to a higher temperature (i.e., the Compound Tan Delta Peak Temperature) and, thereby, the damping capacity of the styrenic block copolymer can be increased for an intended end-use application at a given temperature, such as at or above room temperature. Surprisingly, the Copolymer Tan Delta Peak Temperature of the styrenic block copolymer can be shifted to a higher temperature even when the thermoplastic elastomer compound further includes plasticizer, which is known to decrease Tan Delta Peak Temperature.

One aspect of the invention is a thermoplastic elastomer compound that includes styrenic block copolymer and high softening point tackifier. The styrenic block copolymer has a Copolymer Tan Delta Peak Temperature and the compound has a Compound Tan Delta Peak Temperature. The Compound Tan Delta Peak Temperature is greater than the Copolymer Tan Delta Peak Temperature.

Another aspect of the invention is a plastic article formed from the aforementioned thermoplastic elastomer compound.

A further aspect of the invention is a multi-component plastic article including at least two components formed from different thermoplastic materials and in which at least one of the different thermoplastic materials is the aforementioned thermoplastic elastomer compound.

An even further aspect of the invention is a method for increasing the damping capacity of a thermoplastic elastomer compound including a styrenic block copolymer by further including a high softening point tackifier in the thermoplastic elastomer compound.

Features of the invention will become apparent with reference to the following embodiments. There exist various refinements of the features noted in relation to the above-mentioned aspects of the present invention. Additional features may also be incorporated in the above-mentioned aspects of the present invention. These refinements and additional features may exist individually or in any combination. For instance, various features discussed below in relation to any of the described aspects of the present invention may be incorporated into any of the described aspects of the present invention alone or in any combination.

EMBODIMENTS OF THE INVENTION

In some embodiments, the present invention is directed to a thermoplastic elastomer compound that includes styrenic block copolymer and high softening point tackifier. In other embodiments, the present invention is directed to a plastic article formed from the aforementioned thermoplastic elastomer compound. In further embodiments, the present invention is directed to a multi-component plastic article in which at least one thermoplastic component is formed from the aforementioned thermoplastic elastomer compound. Required and optional features of these and other embodiments of the present invention are described.

As used herein, the term "Compound Tan Delta Peak Temperature" means the Tan Delta Peak Temperature for a thermoplastic elastomer compound of the present invention that comprises high softening point tackifier and styrenic block copolymer.

As used herein, the term "Copolymer Tan Delta Peak Temperature" means the Tan Delta Peak Temperature for the neat styrenic block copolymer; that is, for the styrenic block copolymer, itself, prior to combining it with any other ingredients of the thermoplastic elastomer compound of the present invention.

As used herein, the term "essentially free of" a certain component means, in some embodiments, that no amount of that component is intentionally incorporated into a compound. In other embodiments, it means that less than 1 weight percent of the component is intentionally incorporated into the compound; and, in other embodiments, it means that less than 0.1 weight percent of the component is intentionally incorporated into the compound; and, in other embodiments, it means that less than 0.01 weight percent of the component is intentionally incorporated into the compound; and, in other embodiments, it means that less than 0.001 weight percent of the component is intentionally incorporated into the compound.

As used herein, the term "high softening point tackifier" means a tackifier having a softening point of at least 80° C. according to ASTM 6493.

As used herein, the term "softening point" means a material softening temperature as measured by a ring and ball type method according to ASTM 6493.

As used herein, the term "high vinyl" means that the vinyl content of a styrenic block copolymer (prior to hydrogenation) is greater than 50 mole percent. For example, more than 50 mole percent of the polybutadiene, if present in the midblock, is polymerized at the 1,2-position, and/or, more than 50 mole percent of the polyisoprene, if present in the midblock, is polymerized at the 3,4-position, both of which by driving the polymerization with addition of a polar compound, as is well known by those of ordinary skill in the art. After hydrogenation of the high vinyl styrenic block copolymer, there is little or no vinyl unsaturation remaining. Nonetheless, such a styrenic block copolymer is still referred to as "high vinyl" because it is derived from a high vinyl precursor.

As used herein, the term "low vinyl" means that the vinyl content of a styrenic block copolymer (prior to hydrogenation) is not greater than 50 mole percent.

As used herein, the term "room temperature" means a range of temperature of a defined environment, usually an indoor environment, which is generally considered comfortable for human habitation, and, can include, for example, any temperature ranging from about 15° C. to about 26° C.

As used herein, the term "Tan Delta" means the tangent of delta of a material and is the ratio of the material's loss modulus (E") to the material's storage modulus (E').

As used herein, the term "Tan Delta Peak Temperature" means the temperature at which a prominent peak appears in a graphical depiction of Tan Delta against temperature for a material, as determined by dynamic mechanical analysis using TA Instruments Dynamic Mechanical Analysis Model Q800 in "shear sandwich" mode and for a temperature scan from −40° C. to 100° C. increasing at a rate of 5° C. per minute and with an oscillation frequency of 10 Hz.

Thermoplastic Elastomer Compound

In some embodiments, the present invention is directed to a thermoplastic elastomer compound that includes styrenic block copolymer and high softening point tackifier.

It has been found that, by adding high softening point tackifier to styrenic block copolymer to provide a thermoplastic elastomer compound, the Copolymer Tan Delta Peak Temperature of the styrenic block copolymer can be shifted to a higher temperature (i.e., the Compound Tan Delta Peak Temperature). That is, for thermoplastic elastomer compounds of the present invention, the Compound Tan Delta Peak Temperature is greater than the Copolymer Tan Delta Peak Temperature.

In some embodiments, the Compound Tan Delta Peak Temperature is at least −10° C. In other embodiments, the Compound Tan Delta Peak Temperature is at least 0° C. In further embodiments, the Compound Tan Delta Peak Temperature is at least room temperature. In even further embodiments, the Compound Tan Delta Peak Temperature is from about −10° C. to about 70° C., and, in other embodiments, is from about 5° C. to about 50° C.

Styrenic Block Copolymer

Thermoplastic elastomer compounds of the present invention include one or more styrenic block copolymers.

Styrenic block copolymers that are suitable for use in the present invention include any available styrenic block copolymers that, when combined with the high softening point tackifier, can provide the thermoplastic elastomer compound with useful damping properties at the temperature of an intended end-use application, for example, room temperature or temperatures higher or lower than room temperature. Suitable styrenic block copolymers can be selected also to provide other properties desirable for the end-use application. The present invention contemplates the use of a single type of styrenic block or combinations of two or more different types of styrenic block copolymers.

Non-limiting examples of suitable styrenic block copolymers include styrene-ethylene/butylene-styrene (SEBS), styrene-ethylene/propylene-styrene (SEPS), styrene-ethylene/ethylene/propylene-styrene (SEEPS), styrene-isobutylene-styrene (SIBS), styrene-butadiene-styrene (SBS), styrene-isoprene-styrene (SIS), and combinations thereof.

In some embodiments, the styrenic block copolymer is hydrogenated, such as partially hydrogenated or fully hydrogenated.

In some embodiments, the styrenic block copolymer is selected from hydrogenated styrene-isoprene-styrene block copolymer with hydrogenated vinylic isoprene midblock or high vinyl styrene-(ethylene/butylene)-styrene block copolymer or combinations of these and/or other styrenic block copolymers.

Examples of commercially available hydrogenated styrene-isoprene-styrene block copolymer with hydrogenated vinylic isoprene midblock include one or more of the HYBRAR brand of styrenic block copolymers from Kuraray, Co. Ltd., such as grades KL-7125 and KL-7135.

HYBRAR KL-7125 copolymer is reported by the manufacturer as having a Tan Delta Peak Temperature of −5° C., a Shore A hardness of 64, a tensile elongation of 680%, and a melt flow rate (MFR) of 4 g/10 min at 230° C. with a 2.16 kg weight.

HYBRAR KL-7135 copolymer, which has a relatively higher molecular weight than that of HYBRAR KL-7125 copolymer but is similar in chemical structure, is reported by the manufacturer as having a Tan Delta Peak Temperature of +1° C., a Shore A hardness of 68, and a tensile elongation of 550%. Because of the higher molecular weight, MFR is not measurable at 230° C. and a 2.16 kg weight.

Examples of commercially available high vinyl styrene-(ethylene/butylene)-styrene block copolymer include one or more of the KRATON brand, including the KRATON ERS brand, of styrenic block copolymers from Kraton Polymers LLC, such as grades G1641, G1642, G1643, G1645, MD6958, and MD6959. KRATON brand G series styrenic block copolymers are known to have glass transition temperatures (Tg) ranging from around −55° C. to around −38° C.

As used herein, "high vinyl" means that the vinyl content of the styrenic block copolymer (prior to hydrogenation) is greater than 50 mole percent. In some embodiments, the vinyl content of the styrenic block copolymer is from about 55 to about 90 mole percent, and, in further embodiments, from about 65 to about 90 mole percent.

The high vinyl styrene-(ethylene/butylene)-styrene block copolymer has an ethylene/butylene midblock that is the hydrogenation product of 1,3-butadiene.

Suitable high vinyl styrene-(ethylene/butylene)-styrene block copolymer include those as described in, for example, U.S. Pat. No. 5,777,031 to Djiauw et al. and U.S. Pat. No. 6,984,688 to Gu, each of which is incorporated herein by reference.

It is to be understood that an isoprene midblock that is hydrogenated is converted to an ethylene/propylene midblock. Similarly, it is to be understood that a butadiene midblock that is hydrogenated is converted to an ethylene/butylene midblock.

Examples of other commercially available styrenic block copolymers include hydrogenated styrenic block copolymer available under the SIBSTAR brand from Kaneka, and hydrogenated styrenic block copolymer available under the S.O.E. brand from Asahi KASEI. Additional examples of other commercially available styrenic block copolymers include styrene-isoprene-styrene block copolymer available under the VECTOR brand from TSRC/Dexco, such as the 4000 series, and under the KRATON brand from Kraton Polymers LLC, such as the D1100 series.

In some embodiments, suitable styrenic block copolymers have a relatively low weight average molecular weight. In other embodiments, suitable styrenic block copolymers have a relatively high weight average molecular weight. For example, suitable styrenic block copolymers can have weight average molecular weights in excess of 75,000 and preferably in excess of 200,000. In some embodiments, the styrenic block copolymer has a weight average molecular weight ranging from about 75,000 to about 1 million or from about 75,000 to about 500,000. In other embodiments, the styrenic block copolymer has a weight average molecular weight ranging from about 200,000 to about 1 million or from about 200,000 to about 500,000.

The styrenic block copolymer has a Copolymer Tan Delta Peak Temperature. As discussed above, by adding high softening point tackifier to styrenic block copolymer to provide a thermoplastic elastomer compound, the Copolymer Tan Delta Peak Temperature of the styrenic block copolymer can be shifted to a higher temperature (i.e., the Compound Tan Delta Peak Temperature).

It is believed that the high softening point tackifier is more effective at shifting the Copolymer Tan Delta Peak Temperature to a higher temperature for styrenic block copolymers having a Copolymer Tan Delta Peak Temperature that is greater than about −40° C. but, for example, less than about −10° C., or, as a further example, less than about 0° C., or, as an even further example, less than room temperature, or, as yet a further example, less than a temperature greater than room temperature.

In some embodiments, styrenic block copolymers have a Copolymer Tan Delta Peak Temperature that is greater than about −40° C. but less than −10° C., or, less than 0° C., or, less than room temperature, or, less than a temperature greater than room temperature. In further embodiments, the thermoplastic elastomer compound is essentially free of styrenic block polymers having a Copolymer Tan Delta Peak Temperature that is less than about −40° C.

In other embodiments, the thermoplastic elastomer compound is essentially free of styrene-(ethylene-ethylene/propylene)-styrene block copolymer or low vinyl styrene-(ethylene/butylene)-styrene block copolymer or both. Some standard or low vinyl styrenic block copolymers, such as those available under the SEPTON brand from Kuraray Co., Ltd. and including SEPTON 4000 Series SEEPS copolymers, typically have a Copolymer Tan Delta Peak Temperature that is less than about −40° C.

In further embodiments, the thermoplastic elastomer compound is essentially free of hydrogenated styrene-isoprene-styrene block copolymer with hydrogenated vinylic isoprene midblock. Some commercially available examples of such styrenic block copolymers, such as those available from Kuraray Co., Ltd., under the HYBRAR brand, including grades 7125 and 7135, can be more expensive and thus economically less desirable for some end-use applications.

High Softening Point Tackifier

Thermoplastic elastomer compounds of the present invention include one or more high softening point tackifiers.

By adding high softening point tackifier to styrenic block copolymer, the Copolymer Tan Delta Peak Temperature of the styrenic block copolymer can be shifted to a higher temperature (i.e., the Compound Tan Delta Peak Temperature).

High softening point tackifiers that are suitable for use in the present invention have a softening point of at least about 80° C. according to ASTM 6493. In some embodiments, the softening point is at least 100° C., and, in other embodiments, at least about 120° C., and, in further embodiments, at least about 140° C. In even further embodiments, the softening point ranges from about 80° C. to about 150° C.

Suitable high softening point tackifiers include those derived from rosin feedstock, terpene feedstock, or hydrocarbon feedstock. Hydrocarbon-based high softening point tackifiers can be aliphatic or aromatic, and saturated or unsaturated.

Examples of commercially available high softening point tackifiers include hydrogenated hydrocarbon resins available under the ARKON brand, such as grades P100, P115, P125, and P140, from Arakawa Chemical Industries, Ltd.;

hydrogenated hydrocarbon resins available under the EAS-TOTAC brand, such as grades H-125-W, H-140-W, and H-142-W, from Eastman Chemical Company; hydrogenated hydrocarbon resins available under the PLASTOLYN brand, such as grade R1140, from Eastman Chemical Company; and hydrogenated hydrocarbon resins available under the REGALREZ brand, such as grade 1139, from Eastman Chemical Company.

In some embodiments, the high softening point tackifier includes an amorphous hydrocarbon resin derived from aromatic hydrocarbon feedstock. In further embodiments, the high softening point tackifier is fully hydrogenated and has a saturated cyclo-aliphatic structure.

In some embodiments, the high softening point tackifier has a weight average molecular weight ranging from about 400 to about 3,500. In other embodiments, the high softening point tackifier has a weight average molecular weight ranging from about 1,000 to about 2,000.

High softening point tackifier is included in the thermoplastic elastomer compound of the present invention in amount ranging from about 20 parts by weight to about 200 parts by weight, per 100 parts by weight of the styrenic block copolymer. In some embodiments, the amount of high softening point tackifier ranges from about 30 parts by weight to about 150 parts by weight, per 100 parts by weight of the styrenic block copolymer.

It is believed that, in general, a relatively higher proportion of high softening point tackifier is required to shift the Tan Delta Peak Temperature to a higher temperature for styrenic block copolymer having a relatively higher molecular weight. Conversely, it is believed that, in general, a relatively lower proportion of high softening point tackifier is required to shift the Tan Delta Peak Temperature to a higher temperature for styrenic block copolymer having a relatively lower molecular weight.

Care should be taken to ensure that the thermoplastic elastomer compound of the present invention is formulated to provide properties desirable for a TPE compound and not properties more commonly observed in adhesive compositions. Generally, adhesive compositions are different from TPE compounds at least because adhesive compositions typically are relatively low viscosity compositions which do not possess the useful mechanical properties of TPE compounds. Accordingly, even if up to about 200 parts by weight of high softening point tackifier is used per 100 parts by weight of styrenic block copolymer, the thermoplastic elastomer compound of the present invention is not an adhesive composition. For example, the thermoplastic elastomer compound is not tacky, or it is not sticky to the touch of a human hand.

Optional Plasticizer

In some embodiments, the thermoplastic elastomer compound further includes plasticizer. Plasticizer can be used, for example, to adjust softness and/or improve flow or other properties of the thermoplastic elastomer compound.

Any conventional oil capable of plasticizing styrenic block copolymer, such as mineral oil, vegetable oil, synthetic oil, etc., can be used in the present invention. Examples of commercially available oils include those available under the PURETOL 380 brand from Petro-Canada, and those available under the PRIMOL 382 brand from ExxonMobil.

In some embodiments, plasticizers with a higher molecular weight than that of the aforementioned conventional oils can be used. Polyisobutene (PIB) is an example of such a plasticizer with a relatively higher molecular weight. For example, medium- to high-molecular weight PIB is commercially available under the OPPANOL brand from BASF.

Optional Filler

In some embodiments, the thermoplastic elastomer compound further includes inorganic filler.

Inorganic filler can be used, for example, to lower the cost and/or control properties of the thermoplastic elastomer compound. In other embodiments, the inorganic filler also can be used, for example, as a mineral filler flame retardant.

Non-limiting examples of inorganic fillers include iron oxide, zinc oxide, magnesium oxide, titanium oxide, zirconium oxide, titanium dioxide, alumina, silica, silica-alumina, aluminum hydroxide, magnesium hydroxide, calcium hydroxide, magnesium carbonate, calcium carbonate (heavy, light, colloidal), barium sulfate, calcium sulfate, sodium sulfate, calcium sulfite, calcium silicate, calcium phosphate, magnesium phosphate, talc, mica, kaolin, clay, wollastonite, hydrotalcite, glass beads, glass powders, silica sand, silica rock, silicon nitride, quartz powder, volcanic pumice, diatomaceous earth, white carbon, iron powder and aluminum powder.

In some embodiments, the inorganic filler is calcium carbonate, talc, or mixtures thereof.

Optional Secondary Polymer

In some embodiments, the thermoplastic elastomer compound further includes secondary polymer. Secondary polymer should be compatible with the styrenic block copolymer and can, for example, contribute to improved processability or desirable physical properties, such as hardness, in the thermoplastic elastomer compound.

Suitable secondary polymer includes polyolefin-based resins, including homopolymers, copolymers, blends of polymers, mixtures of polymers, alloys of polymers, and combinations thereof.

Non-limiting examples of polyolefins suitable for use in the present invention include polyethylene (including low-density (LDPE), high-density (HDPE), ultra-high molecular weight (UHDPE), linear-low-density (LLDPE), very-low density, etc.), maleated polypropylene, polypropylene, polybutylene, polyhexalene, polyoctene, and copolymers thereof, olefin block copolymer such as ethylene/alpha-olefin interpolymer, and ethylene-vinyl-acetate (EVA) copolymer. In some embodiments, high density polyethylene (HDPE) and/or polypropylene (PP) are preferred. Such polyolefins are commercially available from a number of sources.

Suitable secondary polymer also includes rubber, such as butyl rubber and ethylene propylene diene monomer (EPDM) rubber. The rubber can be crosslinked or non-crosslinked.

Mixtures, blends, or alloys of secondary polymer include, for example, a thermoplastic vulcanizate (TPV) that is a blend of a continuous phase of a polyolefin such as polypropylene and a discontinuous phase of a vulcanized rubber such as crosslinked EPDM.

Suitable secondary polymer also includes polyphenylene ethers (PPE). Non-limiting examples of types of PPE, sometimes also referred to as polyphenylene oxide, can include poly(2,6-dimethyl-1,4-phenylene ether), poly(2,6-diethyl-1,4-phenylene ether), poly(2-methyl-6-ethyl-1,4-phenylene ether), poly(2-methyl-6-propyl-1,4-phenylene ether), poly(2,6-dipropyl-1,4-phenylene ether), poly(2-ethyl-6-propyl-1,4-phenylene ether), poly(2,6-dimethoxy-1,4-phenylene ether), poly(2,6-di(chloro methyl)-1,4-phenylene ether), poly(2,6-di(bromo methyl)-1,4-phenylene ether), poly(2,6-diphenyl-1,4-phenylene ether), poly(2,6-ditoluyl-1,4-phenylene ether), poly(2,6-dichloro-1,4-phenylene ether), poly (2,6-dibenzyl-1,4-phenylene ether), poly(2,5-dimethyl-1,4-phenylene ether), and combinations thereof.

Optional Bonding Agent

In some embodiments in which the thermoplastic elastomer compound is overmolded onto a thermoplastic substrate, the thermoplastic elastomer compound further includes at least one bonding agent.

For embodiments in which the thermoplastic substrate is polyamide (nylon), suitable bonding agents include maleic anhydride functionalized polymers, such as maleic anhydride functionalized polyolefin and maleic anhydride functionalized styrenic block copolymer. For example, suitable maleic anhydride functionalized polyolefins are described in U.S. Pat. No. 7,842,747 to Gu et al., which is incorporated herein by reference.

Examples of commercially available maleic anhydride functionalized polyolefin include those available under the EXXELOR brand from ExxonMobil Chemical; those available under the POLYBOND brand from Addivant; and those available under the FUSABOND brand from DuPont.

Examples of commercially available maleic anhydride functionalized styrenic block copolymer include those available under the KRATON FG brand, such as grades FG1901 and FG1924, from Kraton Performance Polymers Inc.

For embodiments in which the thermoplastic substrate is a polyolefin such as polypropylene, suitable bonding agents include compatible polyolefins such as those described above as secondary polymers, including polypropylene. Commercially available examples include polypropylene available under the BRASKEM H521 brand from Braskem America Inc.

For embodiments in which the thermoplastic substrate is a another thermoplastic material such as thermoplastic polyurethane (TPU), polycarbonate (PC), polycarbonate/acrylonitrile butadiene styrene (PC/ABS), and polybutylene terephthalate/polycarbonate (PBT/PC), suitable bonding agents include compatible polymers such as TPU or copolyester elastomer (COPE) or blends of TPU/COPE. Commercially available examples include TPU available under the ELASTOLLAN brand from BASF.

Other Optional Additives

In some embodiments, the thermoplastic elastomer compound further includes conventional plastics additives in an amount that is sufficient to obtain a desired processing or performance property for the compound. The amount should not be wasteful of the additive nor detrimental to the processing or performance of the compound. Those skilled in the art of thermoplastics compounding, without undue experimentation but with reference to such treatises as *Plastics Additives Database* (2004) from Plastics Design Library (elsevier.com), can select from many different types of additives for inclusion into the compounds of the present invention.

Non-limiting examples of optional additives that can be included in the thermoplastic elastomer compounds of the present invention include adhesion promoters; biocides; anti-fogging agents; anti-static agents; blowing and foaming agents; bonding agents and bonding polymers; dispersants; flame retardants and smoke suppressants; impact modifiers; initiators; lubricants; micas; pigments, colorants and dyes; processing aids; release agents; silanes, titanates and zirconates; slip and anti-blocking agents; stabilizers; stearates; ultraviolet light absorbers; viscosity regulators; waxes; and combinations of any of the aforementioned additives.

In some embodiments, the thermoplastic elastomer compound further includes a physical foaming agent, such as carbon dioxide, nitrogen, or air, and/or a chemical foaming agent, such as organic or inorganic compounds that release gases upon decomposition, and can be injection molded or extruded into a foamed TPE material.

Ranges of Ingredients in the TPE Compounds

Table 1 below shows the acceptable, desirable, and preferable ranges of ingredients for the thermoplastic elastomer compound of the present invention, based on 100 parts by weight of the styrenic block copolymer included in the thermoplastic elastomer compound.

The thermoplastic elastomer compound of the present invention can comprise, consist essentially of, or consist of these ingredients. Any number between the ends of the ranges is also contemplated as an end of a range, such that all possible combinations are contemplated within the possibilities of Table 1 as embodiments of compounds for use in the present invention. Unless expressly stated otherwise herein, any disclosed number is intended to refer to exactly the disclosed number, "about" the disclosed number, or both exactly the disclosed number and "about" the disclosed number.

TABLE 1

Thermoplastic Elastomer Compound
(parts by weight per 100 parts by weight of SBC)

| Ingredient | Acceptable | Desirable | Preferable |
| --- | --- | --- | --- |
| Styrenic Block Copolymer | 100 | 100 | 100 |
| High Softening Point Tackifier | 20 to 200 | 30 to 170 | 35 to 140 |
| Optional Plasticizer | 0 to 200 | 20 to 150 | 40 to 100 |
| Optional Filler | 0 to 150 | 0 to 100 | 0 to 80 |
| Optional Secondary Polymer | 0 to 300 | 0 to 200 | 0 to 150 |
| Optional Bonding Agent | 0 to 300 | 0 to 200 | 0 to 150 |
| Optional Other Additives | 0 to 100 | 0 to 80 | 0 to 50 |

In some embodiments, especially those for low compression set applications, the thermoplastic elastomer compound can include at least about 50 parts, or, at least about 70 parts, but less than about 100 parts, or less than about 80 parts, by weight of high softening point tackifier, based on 100 parts by weight of the styrenic block copolymer included in the thermoplastic elastomer compound. In further embodiments, it is possible to achieve desirable low compression set and useful damping properties from thermoplastic elastomer compounds of the present invention that include less than about 40 weight percent, or, in some embodiments, less than about 35 weight percent, or, in other embodiments, less than about 25 weight percent, or, in further embodiments, less than about 20 weight percent, of styrenic block copolymer.

In other embodiments, especially those for noise or sound damping applications, the thermoplastic elastomer compound can include at least about 20 parts, or, at least about 40 parts, but less than about 70 parts, or, less than about 50 parts, by weight of high softening point tackifier, based on 100 parts by weight of the styrenic block copolymer included in the thermoplastic elastomer compound.

In further embodiments, especially those for impact damping applications, the thermoplastic elastomer compound can include at least about 75 parts, or, at least about 90 parts, but less than about 150 parts, or, less than about 110 parts, by weight of high softening point tackifier, based on 100 parts by weight of the styrenic block copolymer included in the thermoplastic elastomer compound.

In even further embodiments, the thermoplastic elastomer compound can include less than 30 weight percent of high softening point tackifier based on total weight of the compound. In even further embodiments, the thermoplastic elastomer compound can include less than 28 weight percent of high softening point tackifier based on total weight of the compound.

Processing

The preparation of thermoplastic elastomer compounds of the present invention is uncomplicated once the proper ingredients have been selected. The compound of the present can be made in batch or continuous operations.

Mixing in a continuous process typically occurs in an extruder that is elevated to a temperature that is sufficient to melt the polymer matrix with addition of all additives at the feed-throat, or by injection or side-feeders downstream. Extruder speeds can range from about 200 to about 700 revolutions per minute (rpm), and preferably from about 300 rpm to about 500 rpm. Typically, the output from the extruder is pelletized for later extrusion, molding, thermoforming, foaming, calendering, and/or other processing into polymeric articles.

Subsequent extrusion, molding, thermoforming, foaming, calendering, and/or other processing techniques are well known to those skilled in the art of thermoplastics polymer engineering. Without undue experimentation but with such references as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (www.elsevier.com), one can make articles of any conceivable shape and appearance using compounds of the present invention.

Usefulness of the Invention

In some embodiments, the present invention is directed to a plastic article formed from the thermoplastic elastomer compound as described herein.

In other embodiments, the present invention is directed to a multi-component plastic article which includes at least two components formed from different thermoplastic materials one of which is the thermoplastic elastomer compound as described herein.

In further embodiments, the plastic article or a component of the multi-component plastic article can be shaped from the TPE compound by molding, extruding, thermoforming, calendering, blow molding, and via additive 3-D manufacturing.

In even further embodiments, the present invention is directed to a method for increasing the damping capacity of a thermoplastic elastomer compound including a styrenic block copolymer by further including a high softening point tackifier in the thermoplastic elastomer compound.

As discussed above, it has been found that, by adding high softening point tackifier to styrenic block copolymer to provide a thermoplastic elastomer compound, the Copolymer Tan Delta Peak Temperature of the styrenic block copolymer can be shifted to a higher temperature (i.e., the Compound Tan Delta Peak Temperature). Advantageously, the damping capacity of the styrenic block copolymer can be increased for an intended end-use application at a given temperature, for example, at least −10° C., or at least 0° C., or at room temperature, or greater than room temperature.

Accordingly, thermoplastic elastomer compounds of the present invention can be used for any plastic article or any component of a multi-component plastic article which needs physical properties of a TPE, such as flexibility, elongation, and/or a soft or silky feel, while also providing useful damping capacity for applications at temperatures that are, for example, at least −10° C., or at least 0° C., or at room temperature, or greater than room temperature. Additionally, the thermoplastic elastomer compounds of the present invention advantageously are capable of being processed at relatively high temperatures, such as those required for overmolding.

Because of its usefulness and versatility, the thermoplastic elastomer compound of the present invention has potential for a variety of damping applications in many different industries, including but not limited to: automotive and transportation; household appliances; industrial equipment; electronics; acoustics; communications; healthcare and medical; defense; firearms; security; personal safety; sports protection; and other industries or applications benefiting from the compound's unique combination of properties, such as low compression set and/or sound damping and/or impact damping.

Compression set is the permanent deformation of a viscoelastic material after being subjected to a constant stress and an elevated temperature. Conventional vibration damping thermoplastic elastomer compounds typically utilize low molecular weight styrenic block copolymers, such as HYBRAR 5127 styrenic block copolymer. These conventional TPE compounds tend to have high (i.e., poor) compression set, and, to achieve good damping, typically require in the TPE compound at least 40 weight percent of styrenic block copolymer, which is a relatively expensive ingredient.

According to the present invention, it is possible to use high molecular weight styrenic block copolymers, which provide low compression set, while also achieving useful damping capacity at or above room temperature. In some embodiments, thermoplastic elastomer compounds of the present invention have a compression set (at 70° C. for 22 hours according to ASTM D395) of less than 50%, and, in other embodiments, less than 40%, and, in further embodiments, less than 30%. Additionally, it is possible to achieve desirable low compression set and useful damping properties from thermoplastic elastomer compounds of the present invention that include less than about 40 weight percent, or, in some embodiments, less than about 35 weight percent, or, in other embodiments, less than about 25 weight percent, or, in further embodiments, less than about 20 weight percent, of styrenic block copolymer.

Sound damping is highly desirable for many applications including, for example, for high quality headphones and/or earphones or for speakers and components such as rims or gaskets for speakers. In the acoustics industry, sound damping is can be assessed by a hitting test and a rubbing test. For the hitting test, a cable (e.g., for wired headphones or earphones) is repeatedly hit by a wooden rod to simulate actual usage conditions. For the rubbing test, the wooden is moved back and forth along the cable. The acoustic responses or effective sound pressure levels generated by the hitting and rubbing are determined by an electronic artificial ear according to methodologies such as IEC 711 or evaluated by a human qualified as a so-called "golden ear".

Because damping is frequency specific, vibration damping and sound damping can occur at different frequencies. As such, a material that is good for vibration damping is not necessarily good for sound damping. Indeed, conventional TPE compounds including low molecular weight styrenic block copolymers, such as HYBRAR 5127 styrenic block copolymer, possess good room temperature vibration damping properties. However, the same TPE compounds are not very effective at sound damping for wired headphone and/or earphone cable applications according to the hitting and rubbing tests.

According to the present invention, it is possible to provide excellent sound damping performance according to the hitting and rubbing tests while also achieving useful vibration damping properties. For example, an article formed from the TPE compound of the present invention, in response to a noise stimulus, can produce an effective sound pressure level according to IEC 711 that is at least 80% lower, and, in some embodiments, at least 90% lower, than an effective sound pressure level according to IEC 711 produced by a control article in response to the same noise stimulus.

Impact damping, such as for sports protection, typically requires materials with a relatively low hardness (e.g., having a Shore A hardness of less than about 50) that have good outdoor (e.g., UV and thermal) stability and are additionally capable of withstanding numerous repeated industrial washing machine cycles (e.g., 150 cycles of 70° C. washing and 90° C. drying) while maintaining dimensional stability (e.g., without experiencing substantial shrinkage). Conventional TPE compounds including low molecular weight styrenic block copolymers, such as HYBRAR 5127 styrenic block copolymer, possess good room temperature vibration damping properties. However, the same TPE compounds have poor UV and thermal stability and cannot withstand repeated industrial washing machine cycles.

According to the present invention, it is possible to provide useful impact damping properties at room temperature with a thermoplastic elastomer compound that also has good UV and thermal stability and can withstand repeated industrial washing machine cycles. Additionally, as compared to ethylene-vinyl acetate (EVA) and/or urethane (PU) thermal set foams, which are bench mark materials for impact damping sports protection applications, thermoplastic elastomer compounds of the present invention can provide relative design freedom for sports equipment manufacturers (e.g., the TPE compound of the present invention can be molded with complex geometry) as well as relative additional comfort for sports equipment users (e.g., the TPE compound of the present invention can be softer and more flexible than EVA foam). Articles for impact protection made from the TPE compound of the present invention can be softer, more compact, and more flexible, and, thus, more comfortable, than conventional impact protection articles made from EVA and/or PU.

Additionally, if desirable for any application, the thermoplastic elastomer compound can be overmolded onto a substrate. In some embodiments, the substrate is a thermoplastic substrate such as polyamide (nylon) or polyolefin (e.g., polypropylene) or another thermoplastic material such as thermoplastic polyurethane (TPU), polycarbonate (PC), polycarbonate/acrylonitrile butadiene styrene (PC/ABS), or polybutylene terephthalate/polycarbonate (PBT/PC). According to the present invention, the thermoplastic elastomer compound overmolded onto a thermoplastic substrate has 90 degree peel strength of, in some embodiments, greater than about 8 pounds per inch, and, in other embodiments, greater than about 10 pounds per inch.

Examples

Non-limiting examples of thermoplastic elastomer compounds of various embodiments of the present invention are provided.

Examples Showing Effect of High Softening Point Tackifier

Table 2a below shows sources of ingredients for the thermoplastic elastomer compounds of Examples 1 to 34 and Comparative Example A.

TABLE 2a

| Chemical | Brand | Source |
|---|---|---|
| Styrene-(ethylene/ethylene/propylene)-styrene block copolymer | SEPTON 4055 | Kuraray |
| Hydrogenated styrene-isoprene-styrene block copolymer with hydrogenated vinylic isoprene midblock | HYBRAR 7135 | Kuraray |
| High vinyl styrene-(ethylene/butylene)-styrene block copolymer (Low molecular weight) | KRATON G1642 | Kraton |
| High vinyl styrene-(ethylene/butylene)-styrene block copolymer (High molecular weight) | KRATON G1641 | Kraton |
| High vinyl styrene-(ethylene/butylene)-styrene block copolymer (Very high molecular weight) | KRATON MD6958 | Kraton |
| High vinyl styrene-(ethylene/butylene)-styrene block copolymer (Very high molecular weight) | KRATON MD6959 | Kraton |
| High styrene styrene-(ethylene/butylene)-styrene block copolymer (High molecular weight) | KRATON A1535 | Kraton |
| Styrene-(ethylene/butylene)-styrene block copolymer (Low molecular weight) | KRATON G1650 | Kraton |
| Styrene-(ethylene/butylene)-styrene block copolymer (High molecular weight) | KRATON G1651 | Kraton |
| Styrene-(ethylene/butylene)-styrene block copolymer (Medium molecular weight) | KRATON G1654 | Kraton |
| White mineral oil | 380 vis USP white oil | (numerous) |
| Hydrocarbon resin | PLASTOLYN R1140 | Eastman Chemical |
| Polyethylene resin | DOWLEX 2035 | Dow Chemical |
| Calcium carbonate (limestone) | VICRON 25-11 | Specialty Minerals |
| Wax | KEMAMIDE E | PMC Biogenix |
| Antioxidant | IRGANOX 1010 | BASF |

Table 2b below shows the formulations and certain properties of Examples 1 to 6.

TABLE 2b

| | Example | | | | | |
|---|---|---|---|---|---|---|
| | 1 | | 2 | | 3 | |
| Ingredient | Parts | Wt. % | Parts | Wt. % | Parts | Wt. % |
| SEPTON 4055 | 25 | 7.78 | 25 | 7.78 | 25 | 7.78 |
| HYBRAR 7135 | 75 | 23.34 | 0 | 0 | 0 | 0 |
| KRATON G1642 | 0 | 0 | 75 | 23.34 | 0 | 0 |
| KRATON G1641 | 0 | 0 | 0 | 0 | 75 | 23.34 |
| KRATON MD6958 | 0 | 0 | 0 | 0 | 0 | 0 |
| KRATON MD6959 | 0 | 0 | 0 | 0 | 0 | 0 |

TABLE 2b-continued

| Ingredient | Parts | Wt. % | Parts | Wt. % | Parts | Wt. % |
|---|---|---|---|---|---|---|
| 380 vis USP white oil | 80 | 24.89 | 80 | 24.89 | 80 | 24.89 |
| PLASTOLYN R1140 | 60 | 18.67 | 60 | 18.67 | 60 | 18.67 |
| DOWLEX 2035 | 40 | 12.45 | 40 | 12.45 | 40 | 12.45 |
| VICRON 25-11 | 40 | 12.45 | 40 | 12.45 | 40 | 12.45 |
| KEMAMIDE E | 0.7 | 0.22 | 0.7 | 0.22 | 0.7 | 0.22 |
| IRGANOX 1010 | 0.7 | 0.22 | 0.7 | 0.22 | 0.7 | 0.22 |
| TOTAL | 321.4 | 100.00 | 321.4 | 100.00 | 321.4 | 100.00 |
| Tan Delta Peak Height (unitless) | 0.67 | | 0.48 | | 0.40 | |

| | Example | | | | | |
|---|---|---|---|---|---|---|
| | 4 | | 5 | | 6 | |
| Ingredient | Parts | Wt. % | Parts | Wt. % | Parts | Wt. % |
| SEPTON 4055 | 25 | 7.78 | 25 | 7.78 | 100 | 31.11 |
| HYBRAR 7135 | 0 | 0 | 0 | 0 | 0 | 0 |
| KRATON G1642 | 0 | 0 | 0 | 0 | 0 | 0 |
| KRATON G1641 | 0 | 0 | 0 | 0 | 0 | 0 |
| KRATON MD6958 | 75 | 23.34 | 0 | 0 | 0 | 0 |
| KRATON MD6959 | 0 | 0 | 75 | 23.34 | 0 | 0 |
| 380 vis USP white oil | 80 | 24.89 | 80 | 24.89 | 80 | 24.89 |
| PLASTOLYN R1140 | 60 | 18.67 | 60 | 18.67 | 60 | 18.67 |
| DOWLEX 2035 | 40 | 12.45 | 40 | 12.45 | 40 | 12.45 |
| VICRON 25-11 | 40 | 12.45 | 40 | 12.45 | 40 | 12.45 |
| KEMAMIDE E | 0.7 | 0.22 | 0.7 | 0.22 | 0.7 | 0.22 |
| IRGANOX 1010 | 0.7 | 0.22 | 0.7 | 0.22 | 0.7 | 0.22 |
| TOTAL | 321.4 | 100.00 | 321.4 | 100.00 | 321.4 | 100.00 |
| Tan Delta Peak Height (unitless) | 0.40 | | 0.40 | | 0.25 | |

Table 2c below shows the formulations and certain properties of Examples 7 to 10 and Comparative Example A.

TABLE 2c

| | Example | | | | | |
|---|---|---|---|---|---|---|
| | A | | 7 | | 8 | |
| Ingredient | Parts | Wt. % | Parts | Wt. % | Parts | Wt. % |
| HYBRAR 7135 | 100 | 38.26 | 100 | 35.54 | 100 | 33.18 |
| 380 vis USP white oil | 80 | 30.60 | 80 | 28.43 | 80 | 26.54 |
| PLASTOLYN R1140 | 0 | 0 | 20 | 7.11 | 40 | 13.27 |
| DOWLEX 2035 | 40 | 15.30 | 40 | 14.21 | 40 | 13.27 |
| VICRON 25-11 | 40 | 15.30 | 40 | 14.21 | 40 | 13.27 |
| KEMAMIDE E | 0.7 | 0.27 | 0.7 | 0.25 | 0.7 | 0.23 |
| IRGANOX 1010 | 0.7 | 0.27 | 0.7 | 0.25 | 0.7 | 0.23 |
| TOTAL | 261.4 | 100.00 | 281.4 | 100.00 | 321.4 | 100.00 |
| Tan Delta Peak Height (unitless) | 0.20 | | 0.27 | | 0.45 | |
| Compound Tan Delta Peak Temperature (deg C.) | (Not available) | | (Not available) | | 5 | |

| | Example | | | |
|---|---|---|---|---|
| | 9 | | 10 | |
| Ingredient | Parts | Wt. % | Parts | Wt. % |
| HYBRAR 7135 | 100 | 31.11 | 100 | 29.29 |
| 380 vis USP white oil | 80 | 24.89 | 80 | 23.43 |
| PLASTOLYN R1140 | 60 | 18.67 | 80 | 23.43 |
| DOWLEX 2035 | 40 | 12.45 | 40 | 11.72 |
| VICRON 25-11 | 40 | 12.45 | 40 | 11.72 |
| KEMAMIDE E | 0.7 | 0.22 | 0.7 | 0.21 |
| IRGANOX 1010 | 0.7 | 0.22 | 0.7 | 0.21 |
| TOTAL | 321.4 | 100.00 | 321.4 | 100.00 |
| Tan Delta Peak Height (unitless) | 0.75 | | 0.95 | |
| Compound Tan Delta Peak Temperature (deg C.) | 10 | | 20 | |

Table 2d below shows the formulations and certain properties of Examples 11 to 14.

TABLE 2d

| | Example | | | | | | | |
|---|---|---|---|---|---|---|---|---|
| | 11 | | 12 | | 13 | | 14 | |
| Ingredient | Parts | Wt. % | Parts | Wt. % | Parts | Wt. % | Parts | Wt. % |
| KRATON MD6958 | 100 | 33.18 | 100 | 31.11 | 100 | 29.29 | 100 | 27.67 |
| 380 vis USP white oil | 80 | 26.54 | 80 | 24.89 | 80 | 23.43 | 80 | 22.14 |
| PLASTOLYN R1140 | 40 | 13.27 | 60 | 18.67 | 80 | 23.43 | 100 | 27.67 |
| DOWLEX 2035 | 40 | 13.27 | 40 | 12.45 | 40 | 11.72 | 40 | 11.07 |
| VICRON 25-11 | 40 | 13.27 | 40 | 12.45 | 40 | 11.72 | 40 | 11.07 |
| KEMAMIDE E | 0.7 | 0.23 | 0.7 | 0.22 | 0.7 | 0.21 | 0.7 | 0.19 |
| IRGANOX 1010 | 0.7 | 0.23 | 0.7 | 0.22 | 0.7 | 0.21 | 0.7 | 0.19 |
| TOTAL | 301.4 | 100.00 | 321.4 | 100.00 | 341.4 | 100.00 | 361.4 | 100.00 |

TABLE 2d-continued

|  | Example | | | | | | | |
|---|---|---|---|---|---|---|---|---|
|  | 11 | | 12 | | 13 | | 14 | |
| Ingredient | Parts | Wt. % | Parts | Wt. % | Parts | Wt. % | Parts | Wt. % |
| Tan Delta Peak Height (unitless) | | 0.65 | | 0.70 | | 0.85 | | 0.85 |
| Compound Tan Delta Peak Temperature (deg C.) | | 3 | | 2 | | 7 | | 16 |

Table 2e below shows the formulations and certain properties of Examples 15 to 18.

TABLE 2e

|  | Example | | | | | | | |
|---|---|---|---|---|---|---|---|---|
|  | 15 | | 16 | | 17 | | 18 | |
| Ingredient | Parts | Wt. % | Parts | Wt. % | Parts | Wt. % | Parts | Wt. % |
| KRATON MD6959 | 100 | 33.18 | 100 | 31.11 | 100 | 29.29 | 100 | 27.67 |
| 380 vis USP white oil | 80 | 26.54 | 80 | 24.89 | 80 | 23.43 | 80 | 22.14 |
| PLASTOLYN R1140 | 40 | 13.27 | 60 | 18.67 | 80 | 23.43 | 100 | 27.67 |
| DOWLEX 2035 | 40 | 13.27 | 40 | 12.45 | 40 | 11.72 | 40 | 11.07 |
| VICRON 25-11 | 40 | 13.27 | 40 | 12.45 | 40 | 11.72 | 40 | 11.07 |
| KEMAMIDE E | 0.7 | 0.23 | 0.7 | 0.22 | 0.7 | 0.21 | 0.7 | 0.19 |
| IRGANOX 1010 | 0.7 | 0.23 | 0.7 | 0.22 | 0.7 | 0.21 | 0.7 | 0.19 |
| TOTAL | 301.4 | 100.00 | 321.4 | 100.00 | 341.4 | 100.00 | 361.4 | 100.00 |
| Tan Delta Peak Height (unitless) | | 0.5 | | 0.70 | | 0.70 | | 0.75 |
| Compound Tan Delta Peak Temperature (deg C.) | | −8 | | 3 | | 18 | | 24 |

Table 2f below shows the formulations and certain properties of Examples 19 to 22.

TABLE 2f

|  | Example | | | | | | | |
|---|---|---|---|---|---|---|---|---|
|  | 19 | | 20 | | 21 | | 22 | |
| Ingredient | Parts | Wt. % | Parts | Wt. % | Parts | Wt. % | Parts | Wt. % |
| KRATON A1535 | 100 | 33.18 | 100 | 31.11 | 100 | 29.29 | 100 | 27.67 |
| 380 vis USP white oil | 80 | 26.54 | 80 | 24.89 | 80 | 23.43 | 80 | 22.14 |
| PLASTOLYN R1140 | 40 | 13.27 | 60 | 18.67 | 80 | 23.43 | 100 | 27.67 |
| DOWLEX 2035 | 40 | 13.27 | 40 | 12.45 | 40 | 11.72 | 40 | 11.07 |
| VICRON 25-11 | 40 | 13.27 | 40 | 12.45 | 40 | 11.72 | 40 | 11.07 |
| KEMAMIDE E | 0.7 | 0.23 | 0.7 | 0.22 | 0.7 | 0.21 | 0.7 | 0.19 |
| IRGANOX 1010 | 0.7 | 0.23 | 0.7 | 0.22 | 0.7 | 0.21 | 0.7 | 0.19 |
| TOTAL | 301.4 | 100.00 | 321.4 | 100.00 | 341.4 | 100.00 | 361.4 | 100.00 |
| Tan Delta Peak Height (unitless) | | 0.6 | | 0.65 | | 0.70 | | 0.75 |

TABLE 2f-continued

| | Example | | | | | | | |
|---|---|---|---|---|---|---|---|---|
| | 19 | | 20 | | 21 | | 22 | |
| Ingredient | Parts | Wt. % | Parts | Wt. % | Parts | Wt. % | Parts | Wt. % |
| Compound Tan Delta Peak Temperature (deg C.) | −1 | | 8 | | 18 | | 26 | |

Table 2g below shows the formulations and certain properties of Examples 23 to 28.

TABLE 2g

| | Example | | | | | |
|---|---|---|---|---|---|---|
| | 23 | | 24 | | 25 | |
| Ingredient | Parts | Wt. % | Parts | Wt. % | Parts | Wt. % |
| KRATON G1651 | 100 | 31.11 | 100 | 29.29 | 100 | 27.67 |
| KRATON G1650 | 0 | 0 | 0 | 0 | 0 | 0 |
| 380 vis USP white oil | 80 | 24.89 | 80 | 23.43 | 80 | 22.14 |
| PLASTOLYN R1140 | 60 | 18.67 | 80 | 23.43 | 100 | 27.67 |
| DOWLEX 2035 | 40 | 12.45 | 40 | 11.72 | 40 | 11.07 |
| VICRON 25-11 | 40 | 12.45 | 40 | 11.72 | 40 | 11.07 |
| KEMAMIDE E | 0.7 | 0.22 | 0.7 | 0.21 | 0.7 | 0.19 |
| IRGANOX 1010 | 0.7 | 0.22 | 0.7 | 0.21 | 0.7 | 0.19 |
| TOTAL | 321.4 | 100.00 | 341.4 | 100.00 | 361.4 | 100.00 |
| Tan Delta Peak Height (unitless) | | 0.45 | | 0.55 | | 0.65 |
| Compound Tan Delta Peak Temperature (deg C.) | | 1 | | 2 | | 13 |

| | Example | | | | | |
|---|---|---|---|---|---|---|
| | 26 | | 27 | | 28 | |
| Ingredient | Parts | Wt. % | Parts | Wt. % | Parts | Wt. % |
| KRATON G1651 | 0 | 0 | 0 | 0 | 0 | 0 |
| KRATON G1650 | 100 | 27.67 | 100 | 29.29 | 100 | 31.11 |
| 380 vis USP white oil | 80 | 22.14 | 80 | 23.43 | 80 | 24.89 |
| PLASTOLYN R1140 | 100 | 27.67 | 80 | 23.43 | 60 | 18.67 |
| DOWLEX 2035 | 40 | 11.07 | 40 | 11.72 | 40 | 12.45 |
| VICRON 25-11 | 40 | 11.07 | 40 | 11.72 | 40 | 12.45 |
| KEMAMIDE E | 0.7 | 0.19 | 0.7 | 0.21 | 0.7 | 0.22 |
| IRGANOX 1010 | 0.7 | 0.19 | 0.7 | 0.21 | 0.7 | 0.22 |
| TOTAL | 361.4 | 100.00 | 341.4 | 100.00 | 321.4 | 100.00 |
| Tan Delta Peak Height (unitless) | | 0.75 | | 0.55 | | 0.45 |
| Compound Tan Delta Peak Temperature (deg C.) | | 25 | | 24 | | 21 |

Table 2h below shows the formulations and certain properties of Examples 29 to 34.

TABLE 2h

| | Example | | | | | |
|---|---|---|---|---|---|---|
| | 29 | | 30 | | 31 | |
| Ingredient | Parts | Wt. % | Parts | Wt. % | Parts | Wt. % |
| KRATON G1654 | 100 | 31.11 | 100 | 29.29 | 100 | 27.67 |
| KRATON G1641 | 0 | 0 | 0 | 0 | 0 | 0 |
| 380 vis USP white oil | 80 | 24.89 | 80 | 23.43 | 80 | 22.14 |

TABLE 2h-continued

| Ingredient | Parts | Wt. % | Parts | Wt. % | Parts | Wt. % |
|---|---|---|---|---|---|---|
| PLASTOLYN R1140 | 60 | 18.67 | 80 | 23.43 | 100 | 27.67 |
| DOWLEX 2035 | 40 | 12.45 | 40 | 11.72 | 40 | 11.07 |
| VICRON 25-11 | 40 | 12.45 | 40 | 11.72 | 40 | 11.07 |
| KEMAMIDE E | 0.7 | 0.22 | 0.7 | 0.21 | 0.7 | 0.19 |
| IRGANOX 1010 | 0.7 | 0.22 | 0.7 | 0.21 | 0.7 | 0.19 |
| TOTAL | 321.4 | 100.00 | 341.4 | 100.00 | 361.4 | 100.00 |
| Tan Delta Peak Height (unitless) | | 0.45 | | 0.48 | | 0.50 |
| Compound Tan Delta Peak Temperature (deg C.) | | 3 | | 15 | | 28 |

| | Example | | | | | |
|---|---|---|---|---|---|---|
| | 32 | | 33 | | 34 | |
| Ingredient | Parts | Wt. % | Parts | Wt. % | Parts | Wt. % |
| KRATON G1654 | 0 | 0 | 0 | 0 | 0 | 0 |
| KRATON G1651 | 100 | 27.67 | 100 | 29.29 | 100 | 31.11 |
| 380 vis USP white oil | 80 | 22.14 | 80 | 23.43 | 80 | 24.89 |
| PLASTOLYN R1140 | 100 | 27.67 | 80 | 23.43 | 60 | 18.67 |
| DOWLEX 2035 | 40 | 11.07 | 40 | 11.72 | 40 | 12.45 |
| VICRON 25-11 | 40 | 11.07 | 40 | 11.72 | 40 | 12.45 |
| KEMAMIDE E | 0.7 | 0.19 | 0.7 | 0.21 | 0.7 | 0.22 |
| IRGANOX 1010 | 0.7 | 0.19 | 0.7 | 0.21 | 0.7 | 0.22 |
| TOTAL | 361.4 | 100.00 | 341.4 | 100.00 | 321.4 | 100.00 |
| Tan Delta Peak Height (unitless) | | 0.85 | | 0.75 | | 0.70 |
| Compound Tan Delta Peak Temperature (deg C.) | | 21 | | 11 | | 3 |

Examples of TPE Compounds with Low Compression Set

Table 3a below shows sources of ingredients for the thermoplastic elastomer compounds of Examples 35 to 40, which can be useful for end-use applications requiring low compression set and good damping capacity (e.g., vibration and/or sound damping).

TABLE 3a

| Chemical | Brand | Source |
|---|---|---|
| Styrene-(ethylene/ethylene/propylene)-styrene block copolymer | SEPTON 4077 | Kuraray |
| Hydrogenated styrene-isoprene-styrene block copolymer with hydrogenated vinylic isoprene midblock | HYBRAR 7135 | Kuraray |
| High vinyl styrene-(ethylene/butylene)-styrene block copolymer (Very high molecular weight) | KRATON MD6958 | Kraton |
| White mineral oil | PAROL 500 | Petro-Canada |
| Polyphenylene ether | LXR 040C | Bluestar New Chemical Materials |
| Hydrocarbon resin | PLASTOLYN R1140 | Eastman Chemical |
| HDPE | SCLAIR 2908 | NOVA Chemicals |
| Wax | KEMAMIDE E | PMC Biogenix |
| Antioxidant | IRGANOX 1010 | BASF |

Table 3b below shows the formulations and certain properties of Examples 35 to 40.

TABLE 3b

| | Example | | | | | |
|---|---|---|---|---|---|---|
| | 35 | | 36 | | 37 | |
| Ingredient | Parts | Wt. % | Parts | Wt. % | Parts | Wt. % |
| SEPTON 4077 | 50 | 16.07 | 50 | 14.88 | 50 | 13.85 |
| HYBRAR 7135 | 50 | 16.07 | 50 | 14.88 | 50 | 13.85 |
| KRATON MD6958 | 0 | 0 | 0 | 0 | 0 | 0 |
| PAROL 500 | 80 | 25.71 | 80 | 23.80 | 80 | 22.15 |
| LXR 040C | 30 | 9.64 | 30 | 8.93 | 30 | 8.31 |
| PLASTOLYN R1140 | 75 | 34.11 | 75 | 22.31 | 75 | 20.77 |
| SCLAIR 2908 | 25 | 8.04 | 50 | 14.88 | 75 | 20.77 |
| KEMAMIDE E | 0.42 | 0.13 | 0.42 | 0.12 | 0.42 | 0.12 |
| IRGANOX 1010 | 0.7 | 0.22 | 0.7 | 0.21 | 0.7 | 0.19 |
| TOTAL | 311.1 | 100.00 | 336.1 | 100.00 | 361.1 | 100.00 |
| Hardness (Shore A) | 41 | | 57 | | 69 | |
| Tensile (psic) | 670 | | 910 | | 1130 | |
| Elongation (%) | 580 | | 590 | | 720 | |
| Compression set (%) (70 deg C., 22 h) (ASTM D395) | 15 | | 18 | | 24 | |

| | Example | | | | | |
|---|---|---|---|---|---|---|
| | 38 | | 39 | | 40 | |
| Ingredient | Parts | Wt. % | Parts | Wt. % | Parts | Wt. % |
| SEPTON 4077 | 50 | 16.33 | 0 | 0 | 0 | 0 |
| HYBRAR 7135 | 50 | 16.33 | 0 | 0 | 0 | 0 |
| KRATON MD6958 | 0 | 0 | 100 | 32.13 | 100 | 29.74 |

TABLE 3b-continued

| | | | | | | |
|---|---|---|---|---|---|---|
| PAROL 500 | 80 | 26.13 | 80 | 25.71 | 80 | 23.80 |
| LXR 040C | 0 | 0 | 30 | 9.64 | 30 | 8.92 |
| PLASTOLYN R1140 | 75 | 24.50 | 75 | 24.10 | 75 | 22.31 |
| SCLAIR 2908 | 50 | 16.33 | 25 | 8.03 | 50 | 14.87 |
| KEMAMIDE E | 0.42 | 0.14 | 0.5 | 0.16 | 0.5 | 0.15 |
| IRGANOX 1010 | 0.7 | 0.23 | 0.7 | 0.22 | 0.7 | 0.21 |
| TOTAL | 306.1 | 100.00 | 311.2 | 100.00 | 336.2 | 100.00 |
| Hardness (Shore A) | | 48 | | 28 | | 48 |
| Tensile (psic) | | 720 | | 500 | | 610 |
| Elongation (%) | | 640 | | 560 | | 590 |
| Compression set (%) (70 deg C., 22 h) (ASTM D395) | | 23 | | 21 | | 28 |

Examples of TPE Compounds for Sound Damping

Table 4a below shows sources of ingredients for the thermoplastic elastomer compounds of Examples 41 to 45, which can be useful for sound and/or noise damping end-use applications.

TABLE 4a

| Chemical | Brand | Source |
|---|---|---|
| Styrene-(ethylene/butylene)-styrene block copolymer | SEPTON 8004 | Kuraray |
| Hydrogenated styrene-isoprene-styrene block copolymer with hydrogenated vinylic isoprene midblock | HYBRAR 7125 | Kuraray |
| High vinyl styrene-(ethylene/butylene)-styrene block copolymer (Low molecular weight) | KRATON G1642 | Kraton |
| White mineral oil | 550 vis USP white oil | (numerous) |
| Polyphenylene ether | LXR 040C | Bluestar New Chemical Materials |
| Hydrocarbon resin | PLASTOLYN R1140 | Eastman Chemical |
| Polypropylene | D036W6 | Braskem |
| Wax | KEMAMIDE E | PMC Biogenix |
| Antioxidant | IRGAFOS 168 | BASF |
| Antioxidant | IRGANOX 1010 | BASF |

Table 4b below shows the formulations and certain properties of Examples 41 to 45.

TABLE 4b

| | Example | | | | | |
|---|---|---|---|---|---|---|
| | 41 | | 42 | | 43 | |
| Ingredient | Parts | Wt. % | Parts | Wt. % | Parts | Wt. % |
| SEPTON 8004 | 17 | 18.56 | 17 | 18.56 | 17 | 16.73 |
| HYBRAR 7125 | 30 | 32.75 | 20 | 21.83 | 30 | 29.53 |
| KRATON G1642 | 0 | 0 | 0 | 0 | 0 | 0 |
| 550 vis USP white oil | 10 | 10.92 | 10 | 10.92 | 10 | 9.84 |
| LXR 040C | 20 | 21.83 | 20 | 21.83 | 20 | 19.69 |
| PLASTOLYN R1140 | 10 | 10.92 | 20 | 21.83 | 20 | 19.69 |
| D036W6 | 4 | 4.37 | 4 | 4.37 | 4 | 3.94 |
| KEMAMIDE E | 0.3 | 0.33 | 0.3 | 0.33 | 0.3 | 0.30 |
| IRGAFOS 168 | 0.15 | 0.16 | 0.15 | 0.16 | 0.15 | 0.15 |
| IRGANOX 1010 | 0.15 | 0.16 | 0.15 | 0.16 | 0.15 | 0.15 |
| TOTAL | 91.6 | 100.00 | 91.6 | 100.00 | 101.6 | 100.00 |
| Hardness (Shore A) | | 52 | | 51 | | 52 |
| Tensile (psic) | | 1400 | | 1340 | | 1110 |
| Elongation (%) | | 410 | | 430 | | 440 |

| | Example | | | |
|---|---|---|---|---|
| | 44 | | 45 | |
| Ingredient | Parts | Wt. % | Parts | Wt. % |
| SEPTON 8004 | 17 | 15.80 | 0 | 0 |
| HYBRAR 7125 | 30 | 27.88 | 0 | 0 |
| KRATON G1642 | 0 | 0 | 47 | 41.01 |
| 550 vis USP white oil | 10 | 9.29 | 10 | 8.73 |
| LXR 040C | 20 | 18.59 | 20 | 17.45 |
| PLASTOLYN R1140 | 20 | 18.59 | 20 | 17.45 |
| D036W6 | 10 | 9.29 | 17 | 14.83 |
| KEMAMIDE E | 0.3 | 0.28 | 0.3 | 0.26 |
| IRGAFOS 168 | 0.15 | 0.14 | 0.15 | 0.13 |
| IRGANOX 1010 | 0.15 | 0.14 | 0.15 | 0.13 |
| TOTAL | 107.6 | 100.00 | 114.6 | 100.00 |
| Hardness (Shore A) | | 66 | | 65 |
| Tensile (psic) | | 1540 | | 1830 |
| Elongation (%) | | 460 | | 600 |

Examples of TPE Compounds for Impact Damping (e.g., for Personal and/or Sports Protection)

Table 5a below shows sources of ingredients for the thermoplastic elastomer compounds of the Examples 46 to 50, which can be useful for impact damping for personal and/or sports protection end-use applications.

TABLE 5a

| Chemical | Brand | Source |
|---|---|---|
| Styrene-(ethylene/ethylene/propylene)-styrene block copolymer | SEPTON 4077 | Kuraray |
| Hydrogenated styrene-isoprene-styrene block copolymer with hydrogenated vinylic isoprene midblock | HYBRAR 7135 | Kuraray |
| High vinyl styrene-(ethylene/butylene)-styrene block copolymer (Very high molecular weight) | KRATON MD6958 | Kraton |
| White mineral oil | 380 vis USP white oil | (numerous) |
| Hydrocarbon resin | PLASTOLYN R1140 | Eastman Chemical |
| Polypropylene | H521 | Braskem |
| Calcium carbonate (limestone) | VICRON 25-11 | Specialty Minerals |
| Wax | KEMAMIDE E | PMC Biogenix |
| Antioxidant | IRGAFOS 168 | BASF |
| Antioxidant | IRGANOX 1010 | BASF |

Table 5b below shows the formulations and certain properties of Examples 46 to 50.

TABLE 5b

| Ingredient | Example 46 Parts | Wt. % | Example 47 Parts | Wt. % | Example 48 Parts | Wt. % |
|---|---|---|---|---|---|---|
| SEPTON 4077 | 25 | 7.98 | 50 | 16.07 | 25 | 8.16 |
| HYBRAR 7135 | 75 | 23.94 | 50 | 16.07 | 75 | 24.48 |
| KRATON MD6958 | 0 | 0 | 0 | 0 | 0 | 0 |
| 380 vis USP white oil | 80 | 25.54 | 80 | 25.71 | 80 | 26.11 |
| PLASTOLYN R1140 | 100 | 31.93 | 100 | 32.13 | 100 | 32.64 |
| H521 | 32 | 10.22 | 30 | 9.64 | 25 | 8.16 |
| VICRON 25-11 | 0 | 0 | 0 | 0 | 0 | 0 |
| KEMAMIDE E | 0.42 | 0.13 | 0.42 | 0.13 | 0.6 | 0.20 |
| IRGAFOS 168 | 0.4 | 0.13 | 0.4 | 0.13 | 0.4 | 0.13 |
| IRGANOX 1010 | 0.4 | 0.13 | 0.4 | 0.13 | 0.4 | 0.13 |
| TOTAL | 313.2 | 100.00 | 311.2 | 100.00 | 306.4 | 100.00 |
| Hardness (Shore A) | 38 | | 40 | | 35 | |
| Tensile (psic) | 460 | | 420 | | 570 | |
| Elongation (%) | 440 | | 610 | | 670 | |

| Ingredient | Example 49 Parts | Wt. % | Example 50 Parts | Wt. % |
|---|---|---|---|---|
| SEPTON 4077 | 50 | 16.37 | 0 | 0 |
| HYBRAR 7135 | 50 | 16.37 | 0 | 0 |
| KRATON MD6958 | 0 | 0 | 100 | 27.67 |
| 380 vis USP white oil | 80 | 36.20 | 80 | 22.14 |
| PLASTOLYN R1140 | 100 | 32.74 | 100 | 27.67 |
| H521 | 24 | 7.86 | 40 | 11.07 |
| VICRON 25-11 | 0 | 0 | 40 | 11.07 |
| KEMAMIDE E | 0.6 | 0.20 | 0.6 | 0.17 |
| IRGAFOS 168 | 0.4 | 0.13 | 0.4 | 0.11 |
| IRGANOX 1010 | 0.4 | 0.13 | 0.4 | 0.11 |
| TOTAL | 305.4 | 100.00 | 361.4 | 100.00 |
| Hardness (Shore A) | 36 | | 45 | |

TABLE 5b-continued

| | | |
|---|---|---|
| Tensile (psic) | 730 | 650 |
| Elongation (%) | 850 | 800 |

Examples of Damping TPE Compounds for Overmolding onto a Nylon Substrate

Table 6a below shows sources of ingredients for the thermoplastic elastomer compounds of Examples 51 to 54, which can be useful for damping end-use applications involving overmolding onto a nylon substrate.

TABLE 6a

| Chemical | Brand | Source |
|---|---|---|
| Hydrogenated styrene-isoprene-styrene block copolymer with hydrogenated vinylic isoprene midblock | HYBRAR 7125 | Kuraray |
| High vinyl styrene-(ethylene/butylene)-styrene block copolymer (Very high molecular weight) | KRATON MD6958 | Kraton |
| High styrene content styrene-(ethylene/butylene)-styrene block copolymer (High molecular weight) | KRATON A1535 | Kraton |
| White mineral oil | 550 vis USP white oil | (numerous) |
| Hydrocarbon resin | PLASTOLYN R1140 | Eastman Chemical |
| Maleic anhydride functionalized styrenic block copolymer | KRATON FG1924 | Kraton |
| Maleic anhydride functionalized polypropylene | EXXELOR VA1801 | ExxonMobil Chemical |
| LDPE | NA206 | Equistar |
| Calcium carbonate (limestone) | VICRON 25-11 | Specialty Minerals |
| Wax | KEMAMIDE B | PMC Biogenix |
| Antioxidant | IRGANOX 1010 | BASF |

Table 6b below shows the formulations and certain properties of Examples 51 to 54.

TABLE 6b

| Ingredient | Example 51 Parts | Wt. % | Example 52 Parts | Wt. % | Example 53 Parts | Wt. % | Example 54 Parts | Wt. % |
|---|---|---|---|---|---|---|---|---|
| HYBRAR 7125 | 80 | 15.91 | 80 | 14.77 | 80 | 13.87 | 0 | 0 |
| KRATON MD6958 | 0 | 0 | 0 | 0 | 0 | 0 | 120 | 24.86 |
| KRATON A1535 | 70 | 13.92 | 40 | 7.38 | 40 | 6.93 | 0 | 0 |
| 550 vis USP white oil | 50 | 9.95 | 50 | 9.23 | 50 | 8.67 | 45 | 9.32 |
| PLASTOLYN R1140 | 80 | 15.91 | 80 | 14.77 | 80 | 13.87 | 80 | 16.57 |
| KRATON FG1924 | 90 | 17.90 | 0 | 0 | 0 | 0 | 25 | 5.18 |
| EXXELOR VA1801 | 0 | 0 | 120 | 22.15 | 120 | 20.80 | 71 | 14.71 |
| NA206 | 0 | 0 | 40 | 7.38 | 75 | 13.00 | 10 | 2.07 |
| VICRON 25-11 | 130 | 25.86 | 130 | 23.99 | 130 | 22.54 | 130 | 26.93 |
| KEMAMIDE B | 1.8 | 0.36 | 0.9 | 0.17 | 0.9 | 0.16 | 0.9 | 0.19 |
| IRGANOX 1010 | 0.9 | 0.18 | 0.9 | 0.17 | 0.9 | 0.16 | 0.9 | 0.19 |
| TOTAL | 502.7 | 100.00 | 541.8 | 100.00 | 576.8 | 100.00 | 482.8 | 100.00 |

TABLE 6b-continued

|  | Example | | | | | | | |
|---|---|---|---|---|---|---|---|---|
|  | 51 | | 52 | | 53 | | 54 | |
| Ingredient | Parts | Wt. % | Parts | Wt. % | Parts | Wt. % | Parts | Wt. % |
| Hardness (Shore A) | 32 | | 55 | | 62 | | 40 | |
| Tensile (psic) | 400 | | 550 | | 600 | | 400 | |
| Elongation (%) | 800 | | 640 | | 590 | | 550 | |
| Overmold substrate | nylon (30% glass filled, nylon 6) | | nylon (30% glass filled, nylon 6) | | nylon (30% glass filled, nylon 6) | | nylon (30% glass filled, nylon 6) | |
| OM 90 degree peel strength (lb/in) | >12 | | >16 | | >16 | | >16 | |

Examples of Damping TPE Compounds for Overmolding onto Other Thermoplastic Substrates Table 7a below shows sources of ingredients for the thermoplastic elastomer compounds of Examples 55 to 59, which can be useful for damping end-use applications involving overmolding onto thermoplastic substrates such as polyolefin or TPU, PC, PC/ABS, and PC/PBT.

TABLE 7a

| Chemical | Brand | Source |
|---|---|---|
| Styrene-(ethylene/ethylene/propylene)-styrene block copolymer | SEPTON 4055 | Kuraray |
| Hydrogenated styrene-isoprene-styrene block copolymer with hydrogenated vinylic isoprene midblock | HYBRAR 7135 | Kuraray |
| White mineral oil | 380 vis USP white oil | (numerous) |
| Hydrocarbon resin | PLASTOLYN R1140 | Eastman Chemical |
| TPU | ELASTOLLAN 1180A10 | BASF |
| Polyethylene | DOWLEX 2035 | Dow Chemical |
| Polypropylene | H521 | Braskem |
| Calcium carbonate (limestone) | VICRON 25-11 | Specialty Minerals |
| UV absorber | TINUVIN 328 | BASF |
| UV absorber | TINUVIN 622 | BASFtinuvin |
| Wax | KEMAMIDE B | PMC Biogenix |
| Antioxidant | IRGANOX 1010 | BASF |

Table 7b below shows the formulations and certain properties of Examples 55 to 59.

TABLE 7b

|  | Example | | | | | | | | | | | |
|---|---|---|---|---|---|---|---|---|---|---|---|---|
|  | 55 | | 56 | | 57 | | 58 | | 59 | | | |
| Ingredient | Parts | Wt. % | Parts | Wt. % | Parts | Wt. % | Parts | Wt. % | Parts | Wt. % | | |
| SEPTON 4055 | 50 | 15.83 | 50 | 15.11 | 50 | 10.89 | 25 | 5.50 | 25 | 5.44 | | |
| HYBRAR 7135 | 50 | 15.83 | 50 | 15.11 | 50 | 10.89 | 75 | 16.51 | 75 | 16.33 | | |
| 380 vis USP white oil | 80 | 25.32 | 80 | 24.18 | 80 | 17.42 | 80 | 17.61 | 80 | 17.42 | | |
| PLASTOLYN R1140 | 100 | 31.65 | 100 | 30.22 | 100 | 21.78 | 75 | 16.51 | 60 | 13.07 | | |
| ELASTOLLAN 1180A10 | 0 | 0 | 0 | 0 | 135 | 29.40 | 135 | 29.72 | 135 | 29.40 | | |
| DOWLEX 2035 | 0 | 0 | 0 | 0 | 0 | 0 | 20 | 4.40 | 40 | 8.71 | | |
| H521 | 35 | 11.08 | 50 | 15.11 | 0 | 0 | 0 | 0 | 0 | 0 | | |
| VICRON 25-11 | 0 | 0 | 0 | 0 | 40 | 8.71 | 40 | 8.81 | 40 | 8.71 | | |
| TINUVIN 328 | 0 | 0 | 0 | 0 | 1.3 | 0.28 | 1.3 | 0.29 | 1.3 | 0.28 | | |
| TINUVIN 622 | 0 | 0 | 0 | 0 | 1.3 | 0.28 | 1.3 | 0.29 | 1.3 | 0.28 | | |
| KEMAMIDE B | 0.42 | 0.13 | 0.42 | 0.13 | 0.9 | 0.20 | 0.9 | 0.20 | 0.9 | 0.20 | | |
| IRGANOX 1010 | 0.5 | 0.16 | 0.5 | 0.15 | 0.7 | 0.15 | 0.7 | 0.15 | 0.7 | 0.15 | | |
| TOTAL | 315.9 | 100.00 | 330.9 | 100.00 | 459.2 | 100.00 | 454.2 | 100.00 | 459.2 | 100.00 | | |
| Hardness (Shore A) | 41 | | 54 | | 35 | | 40 | | 50 | | | |
| Tensile (psic) | 830 | | 950 | | 800 | | 850 | | 850 | | | |
| Elongation (%) | 450 | | 400 | | 700 | | 700 | | 800 | | | |
| Overmold substrate | PP | | PP | | 85A aromatic TPU | | 85A aromatic TPU | | 85A aromatic TPU | | | |
| OM 90 degree peel strength (lb/in) | Cohesive fail | | Cohesive fail | | Cohesive fail | | Cohesive fail | | Cohesive fail | | | |

Without undue experimentation, those having ordinary skill in the art can utilize the written description of the present invention, including the Examples, to formulate thermoplastic elastomer compounds that exhibit useful damping properties, such as damping properties at or above room temperature, while also being capable of processing at relatively high temperatures, including those conditions required for overmolding.

All documents cited in the Embodiments of the Invention are, in relevant part, incorporated herein by reference; the citation of any document is not to be construed as an admission that it is prior art with respect to the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of the present invention.

What is claimed is:

1. A multi-component plastic article comprising at least two components formed from different thermoplastic materials, wherein at least one of the different thermoplastic materials is a thermoplastic elastomer compound and at least one other of the at least two components is a thermoplastic substrate onto which the thermoplastic elastomer compound is overmolded;

wherein the thermoplastic elastomer compound consists of:
(a) 100 parts by weight of styrenic block copolymer having a Copolymer Tan Delta Peak Temperature, wherein the styrenic block copolymer is hydrogenated;
(b) from about 50 to about 200 parts by weight of tackifier having a softening point of at least about 120° C. according to ASTM 6493;
(c) from 0 to about 200 parts by weight of plasticizer;
(d) from 0 to about 150 parts by weight of filler;
(e) from 0 to about 300 parts by weight of secondary polymer selected from polyethylene, polypropylene, butyl rubber, ethylene propylene diene monomer (EPDM) rubber, thermoplastic vulcanizate, and combinations thereof;
(f) from 0 to 300 parts by weight of bonding agent; and
(g) from 0 to about 100 parts by weight of at least one additive selected from anti-fogging agents; anti-static agents; blowing and foaming agents; dispersants; flame retardants and smoke suppressants; initiators; pigments, colorants and dyes; silanes, titanates and zirconates; stabilizers and antioxidants; stearates; ultraviolet light absorbers; waxes; and combinations thereof; and wherein the thermoplastic elastomer compound has a Compound Tan Delta Peak Temperature, and the Compound Tan Delta Peak Temperature is greater than the Copolymer Tan Delta Peak Temperature; and wherein either:
(x) the thermoplastic substrate comprises polyamide, and wherein the bonding agent is present in the thermoplastic elastomer compound and the bonding agent is selected from the group consisting of maleic anhydride functionalized polyolefin, maleic anhydride functionalized styrenic block copolymer, and combinations thereof; or
(y) the thermoplastic substrate comprises polyolefin, and wherein the bonding agent is present in the thermoplastic elastomer compound and the bonding agent is selected from polyethylene, polypropylene, and combinations thereof; or
(z) the thermoplastic substrate comprises a thermoplastic material selected from the group consisting of thermoplastic polyurethane, polycarbonate, polycarbonate/acrylonitrile butadiene styrene, and polybutylene terephthalate/polycarbonate, and wherein the bonding agent is present in the thermoplastic elastomer compound and the bonding agent is selected from thermoplastic polyurethane, copolyester elastomer, and blends of thermoplastic polyurethane and copolyester elastomer.

2. The multi-component plastic article of claim 1, wherein the filler is selected from calcium carbonate, talc, and combinations thereof.

3. The multi-component plastic article of claim 1, wherein the compound is essentially free of styrene-(ethylene-ethylene/propylene)-styrene block copolymer and low vinyl styrene-(ethylene/butylene)-styrene block copolymer.

4. The multi-component plastic article of claim 1, wherein the styrenic block copolymer is selected from at least one of hydrogenated styrene-isoprene-styrene block copolymer with hydrogenated vinylic isoprene midblock and high vinyl styrene-(ethyl ene/butyl ene)-styrene block copolymer.

5. The multi-component plastic article of claim 1, wherein the Copolymer Tan Delta Peak Temperature is greater than −40° C. but less than −10° C.

6. The multi-component plastic article of claim 1, wherein the Compound Tan Delta Peak Temperature is at least −10° C.

7. The multi-component plastic article of claim 1, wherein the tackifier has a weight average molecular weight ranging from about 400 to about 3,500.

8. The multi-component plastic article of claim 1, wherein the tackifier comprises a saturated cyclo-aliphatic amorphous hydrocarbon resin.

* * * * *